United States Patent Office 2,742,901
Patented Apr. 24, 1956

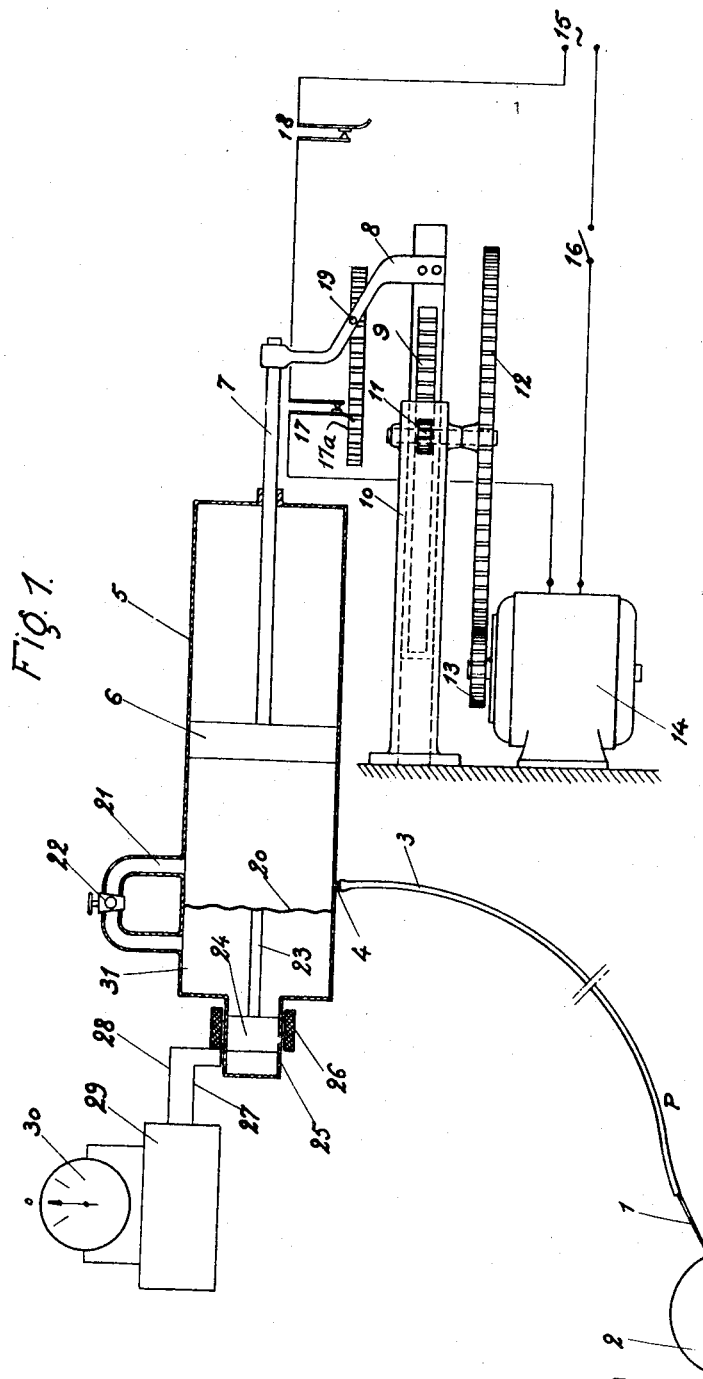

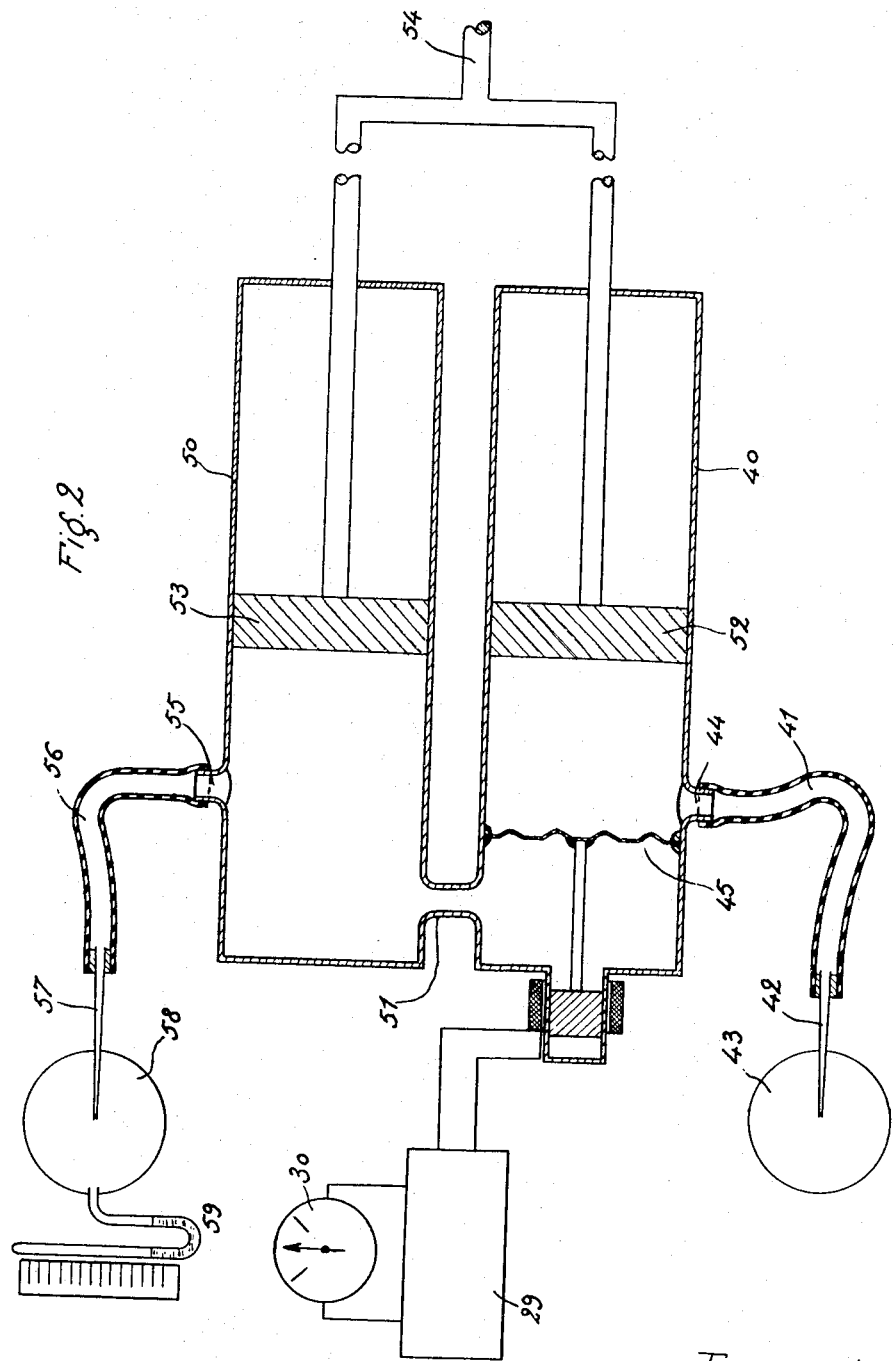

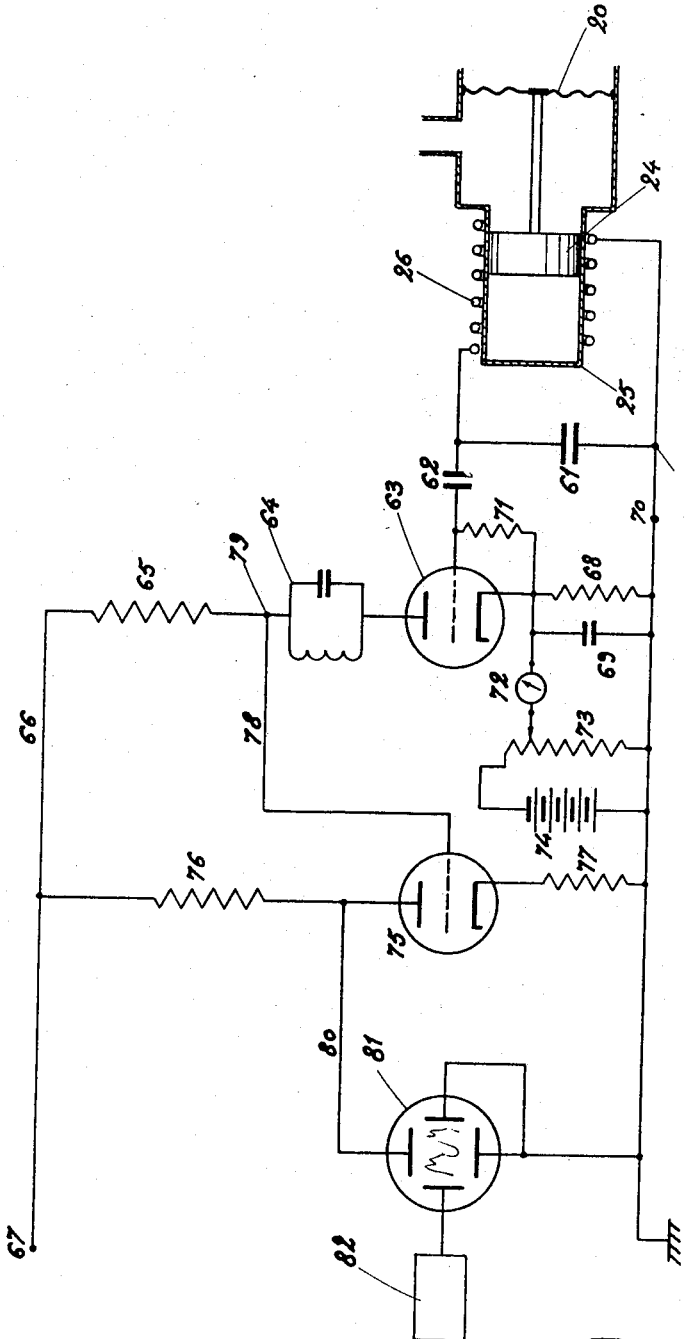

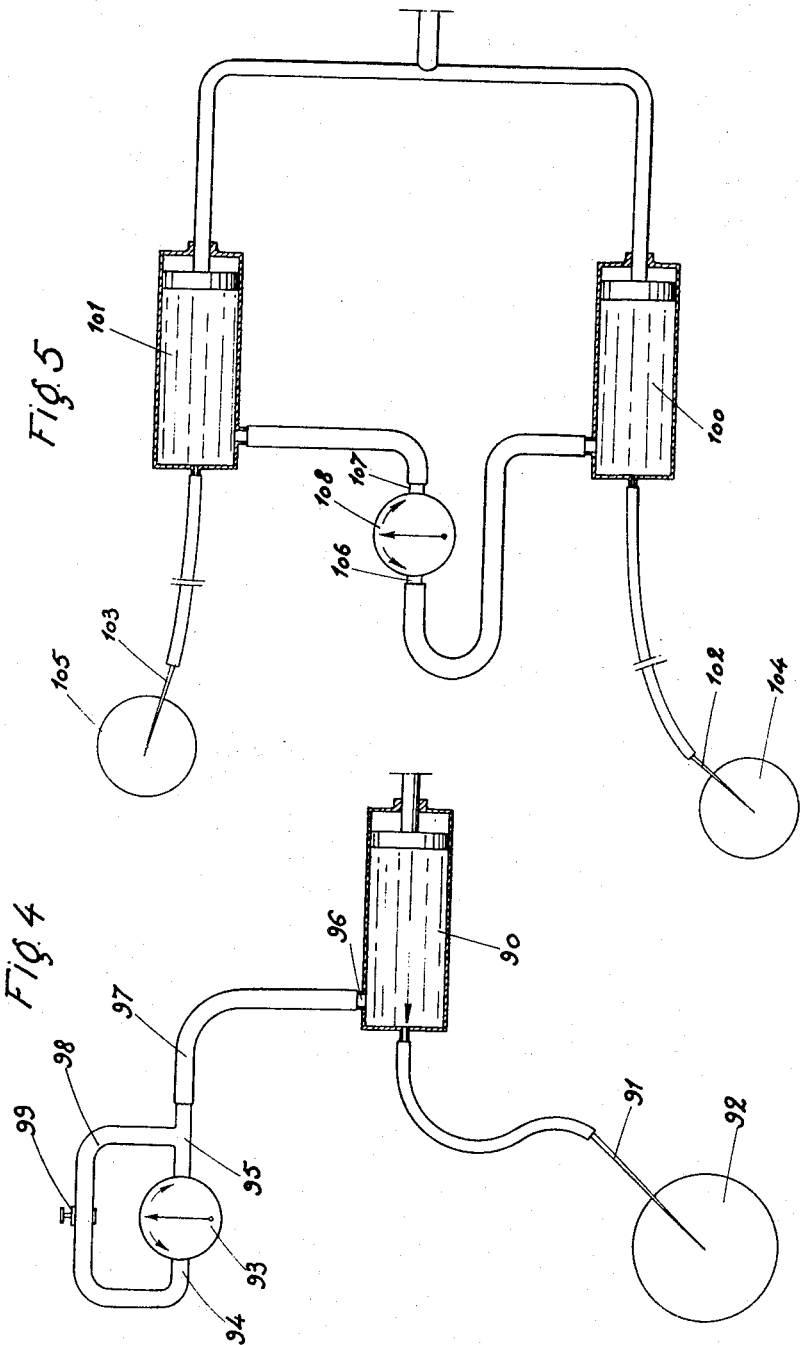

2,742,901

APPARATUS FOR INJECTION OF FLUID UNDER CONTROLLED PRESSURE CONDITIONS

Sigfrid Krauthamer, Issy-les-Moulineaux, France

Application January 15, 1952, Serial No. 266,555

Claims priority, application France January 23, 1951

7 Claims. (Cl. 128—214)

The present invention has for its object an apparatus for injecting a liquid under controlled pressure, in particular into blood vessels or into the heart chambers. It is often of vital interest to ascertain and to control during injection into such a blood vessel or the like cavity inside the human body, the modifications in pressure appearing inside it.

Injection apparatuses have already been proposed and applied wherein a manometer measured and indicated in a continuous manner the value of the pressure at the input of the injection needle; the method resorted to in such cases consisted in ascertaining for each injected volume the loss of head in the actual needle after which the needle being introduced into the body, the modifications in pressure were estimated in relationship with the reference pressure corresponding to said loss of head.

The experience acquired with apparatuses of this type have shown, however, that the loss of head corresponding to the flow of injected liquid through the needle varies considerably with the flow of liquid and may conceal the variations in pressure inside the cavity, which latter variations are often much smaller than the loss of head in the needle.

The present invention has for its primary object an apparatus which provides readily applicable means for the permanent control of the actual pressure of injection.

A more specific object of the invention consists in a control system whereby it is possible to ascertain at each moment the average pressure prevailing at any moment inside the cavity into which the injection is being made and also to watch the instantaneous modifications in pressure, i. e. the pulsatory pressure so as to define the shape and the amplitude of the latter which may lead to information as to where the needle inside the cavity concerned is located.

Further objects, features and advantages of the invention will appear, moreover, from the following description of two embodiments, given by way of example, reference being made to accompanying drawings, wherein:

Fig. 1 is a diagrammatic view of a syringe-operating device;

Fig. 2 is a similar view relating to a double syringe device;

Fig. 3 is a wiring diagram of an electronic control system that may be used in association with either of the devices illustrated in the preceding figures.

Fig. 4 shows diagrammatically a modification of Fig. 1;

Fig. 5 shows diagrammatically a modification of Fig. 2.

In a particular embodiment illustrated in Fig. 1, the device includes an injection needle 1 adapted to enter a cavity 2 in the patient's body, said needle being fed through a pipe 3 connected with the lateral connection 4 on a syringe 5 inside which a piston 6 is adapted to slide. The rod 7 of said piston is coupled through an arm 8 with a rack 9 adapted to slide inside a suitable support 10. The rack 9 meshes with a pinion 11 to which the pinions 12 and 13 of a speed-reducing gear transmit the movement of an electric motor 14. The motor speed reducing gear, pinion and rack impart a uniform movement to the piston. Motor 14 is connected with the mains at 15 through the agency on one hand of a hand-operated switch 16 and on the other of two automatic switches 17 and 18 operating at the beginning and at the end of the stroke of the syringe piston and they are inserted to this end in the path of a projection 19 carried by the arm 8, in a manner such that said projection opens respectively each of said switches 17 and 18 when the piston 6 arrives at the corresponding end of its stroke inside the cylinder 5.

The switch 17 is adapted to be shifted over a scale provided on a rule 17a and to each position of said switch with reference to said rule there corresponds a predetermined volume of fluid to be injected through the hypodermic injection needle 1.

On the downstream side of the connection provided on the syringe 5, is located a deformable diaphragm 20 fitted permanently and fluidtightly across the syringe. A pressure compensation pipe 21 connects the chambers formed in the syringe to either side of the syringe diaphragm, a cock being provided in said pipe 21 at 22 to close this connection when desired.

The central portion of the diaphragm 20 carries a rod 23 rigid with a metal core 24 sliding with slight friction inside a tubular extension 25 of the syringe. The cross-section of the extension 25 is selected so as to be small with reference to the cross-section of the syringe cylinder. A coil 26 is fitted over the extension 25 and is connected through wires 27 and 28 with an electronic system 29 associated with one or several indicating and measuring instruments 30. The details of the structure of this electronic control system are described hereinafter with reference to Fig. 3.

With a view to proceeding with an injection into the patient's body and after the syringe has been filled with the liquid to be injected, the gear driving the piston 6 is started through a closing of the switch 16, the cock 22 being open while the needle 1 is not as yet introduced into the patient's body. The diaphragm 20 remains then inoperative, as its two surfaces are submitted to the pressure corresponding to the loss of head inside the needle. The cock is then closed, and then the needle is introduced into the cavity 2 in the patient's body. The reference pressure acting on the left hand side of the diaphragm 20, as viewed in Fig. 1, i. e. inside the chamber 31, remains unvarying equal to the pressure corresponding to the loss of head inside the needle, while the pressure on the right hand side of the diaphragm viewed in Fig. 1, corresponds to this loss in head increased by the pressure prevailing inside the cavity 2.

Under the action of the difference in pressure across the diaphragm 20, the latter is shifted and carries along with it the core 24: this leads to variations in the electric data relating to the coil 26, and such variations are detected by the electronic system 29, and shown for reading on the measuring instrument 30 the dial of which carries a scale obtained through a suitable gauging in pressure units such as centimeters of mercury height for instance.

Now, if the cock 22 is closed only after the needle has been introduced into the recess 2, and the motor 14 driving the piston 6 has been started, the reference pressure inside the left hand side chamber 31 of the syringe will be equal to the loss of head inside the needle increased by the pressure prevailing at the start inside the cavity. The differential pressure measured under such conditions corresponds to the extra pressure produced by the actual injection.

In both cases, the manometric means measuring only the pressure to be checked, indicate the value and the variations of the said pressure with an accuracy that is far superior to that of a manometer measuring the total pressure prevailing at the input of the injection pipe.

This arrangement still has, however, a drawback that consists in its not allowing to distinguish the actual variations in pressure arising inside the cavity, from those produced by the possible irregularities in flow; the arrangement illustrated in Fig. 2 overcomes this inconvenience.

This latter arrangement includes a syringe 40 that feeds, in the same manner as the syringe of Fig. 1, a yielding pipe 41 opening into the injection needle 42 engaging a cavity while there is again provided on the downstream side of the connection 44 on the syringe that is associated with the input end of the pipe 41, a yielding diaphragm 45 associated with pressure-detecting means similar to those disclosed above. Adjacent to the syringe 40 is arranged a further similar syringe 50 the outer end of which communicates through the pipe element 51 with the end of the syringe 40 on the downstream side of the diaphragm 45. The corresponding pistons 52 and 53 in the two syringes are controlled in unison through a single rod 54 controlled by a single motor through the agency of driving means of the type described with reference to Fig. 1 or through any other equivalent means of known type. The additional or reference syringe cylinder 50 carries a connection 55 similar to the connection 44 on the primary syringe 40 and opening into a pipe 56 leading to a needle 57 entering a reference cavity 58. The pressure inside said cavity is measured by a conventional manometer 59.

There is thus arranged, side by side with the syringe 40 and the pipe 41 connecting it with the cavity 43, in the patient's body, a second syringe 50 connected through the pipe 56 with the reference cavity 58 inside which may be produced a predetermined pressure of the magnitude of that which it is desired to obtain during injection inside the cavity in the patient's body. Steps are taken so that the losses of head in the two pipes 41 and 56 and the needles 42 and 57 may remain always equal, in other words, said pipes are selected so as to be practically identical. The differences in pressure existing between the two syringes are equal under such conditions to the difference in the pressures prevailing in the cavities 43 and 58 inside which the injection is performed simultaneously. Now the difference between the pressure in the syringes is measured by means of the electronic control system 29, the measuring instrument or instruments 30 giving thus at each moment a reading of the difference between the known pressure prevailing in the reference cavity 58 and the unknown pressure prevailing in the cavity 43 into which the experimental injection is being made.

It is easy to check, through a preliminary operation whether the needles 42 and 57 cause the same losses of head to arise when the two pistons move and consequently, the necessary corrections may be easily provided.

It is possible, on the other hand, to provide for a regulating arrangement for modifying the output whenever the differences in pressure detected rise beyond a predetermined value.

An obvious advantage of this arrangement consists in the fact that the modifications in output due to the fortuitous modifications in speed of the motor have but a small action on the detecting of measuring means as these modifications arising in the two syringes compensate each other at every moment, provided, however, that the two needles 42 and 57 are practically identical.

Turning now to Fig. 3, an embodiment of the electronic control system will be now described, said control system being capable of application to both the arrangements described with reference to Figs. 1 and 2.

The coil 26 surrounding the extension 25 of a syringe is again shown in said Fig. 3 with the metal core 24 sliding inside the syringe extension in unison with the movements of the manometric diaphragm 20; the coil 26 forms, with the condenser 61, an oscillating circuit connected through a condenser 62 with the grid of an oscillating vacuum tube 63. The anode of this tube is connected through the agency of a second oscillating circuit 64 and of a resistance 65 with a wire 66 connected in its turn at 67 with a source of anode voltage that is not illustrated. The cathode of the tube 63 is connected, on the other hand, with a biasing resistance 68 mounted in parallel with a condenser 69, said resistance 68 and condenser 69 being grounded together through the wire 70. The coupling between the anode and grid circuits is performed through the internal capacity of the tube 63 and the grid of the latter is connected, on the other hand, in the conventional manner with the cathode through a leak resistance 71. The modification in the anode current of the oscillating tube 63 may be detected by a measuring instrument 72 of which one terminal is connected with the cathode of the tube 63 and the other with the slider of a potentiometer 73 the terminals of which are connected to battery 74.

An amplifier tube 75 is connected at its anode with the anode voltage feeding wire 66 through a loading resistance 76, while its cathode is connected with the grounding wire 70 through a resistance 77, and its grid is connected through a wire 78 with the point 79 located just behind the resistance 65 adapted to load the anode of the oscillating tube 63. The variable voltage of the anode of the amplifier tube 75 is fed through a wire 80 to one of the vertical plates of a cathode ray oscillograph 81, one of the horizontal plates of said tube being connected with a time base 82. The two other plates of the cathode ray tube are connected with the grounding wire 70.

The movements of the core 24 inside the coil 26 produce modifications in the oscillating conditions which modifications are transformed into a variation in the mean anode current of the tube 63. The measuring instrument 72 that is suitably damped indicates these variations and it may advantageously carry a scale of pressure variations after a preliminary gauging.

The variations in the instantaneous value of the mean anode current are transformed, on the other hand, into variations of the potential at the point 79 and are applied, after amplification by the tube 75, to the vertical plates of the cathode ray oscillograph 81. The time-base imparts to the luminous spot of the tube a suitable sweeping movement over the screen so as to make a diagram of the pulsatory pressure with reference to time appear in the usual manner on said screen.

It is thus possible to ascertain at every moment, on one hand, the mean pressure prevailing inside the cavity in which the injection is being performed, said pressure being indicated by the instrument 72 and on the other hand, the shape and amplitude of the pulsatory pressure through the curve appearing on the screen of the cathode ray oscillograph.

My invention is obviously not limited to the embodiment selected and illustrated in the drawings, that are given solely by way of examples, various modifications may be considered both as concerns the execution of the manometric means as that of the injecting means. Thus, it is possible to separate, if desired, the manometric arrangement from the actual syringes, as shown diagrammatically in Figs. 4 and 5.

The arrangement illustrated diagrammatically in Fig. 4 is equivalent to that of Fig. 1; a syringe 90 feeds on one hand a needle 91 adapted to enter a cavity 92 and, on the other hand, a differential manometer having two inputs 94 and 95. The lateral connection 96 on the syringe body is connected permanently through a pipe 97 with the manometer input 95 that communicates in its turn with the input 94 through a by-pass connection 98 provided with a cock 99 adapted to close it when required and playing the same part as the stop cock 22 shown in Fig. 1.

The manner of operating with said arrangement is obviously the same as in the case of Fig. 1 and further details are not necessary.

Fig. 5 is similarly a diagram equivalent to that of the arrangement of Fig. 2. Two identical syringes 100 and 101, feed respectively two needles 102, 103 opening respectively into the cavity 104 in the patient's body on one hand and on the other hand either a reference recess 105 in which a predetermined reference pressure may be produced or else into the atmosphere, in which latter case the reference pressure is equal to atmospheric pressure. The two syringes 100 and 101 deliver, on the other hand, the liquid respectively into two inputs 106, 107 of a differential manometer 108, which will thus indicate at any moment the relative value of the pressure inside the cavity 104, as compared with the reference pressure selected.

The differential manometers 93 (Fig. 4) and 108 (Fig. 5) are preferably of the type associated with electronic means for detecting the movements of the diaphragm submitted to the differential pressure in accordance with the method described with reference to Fig. 3. The high sensitivity of such detecting means allows operating with a diaphragm the axial movements of which are of a magnitude much lower than that of the movements required in conventional manometers.

What I claim is:

1. An injection apparatus comprising two substantially identical syringes including pistons sliding therein, hypodermic needles adapted to be fed by the corresponding syringes and to operate in different cavities, means for the simultaneous control of the pistons in both syringes and differential pressure-sensitive means adapted to measure the difference in the pressures at the input ends of both needles.

2. An injection apparatus comprising two substantially identical syringes including pistons sliding therein, hypodermic needles adapted to operate in different cavities, pipes connecting the needles with the corresponding syringes, means for the simultaneous control of the pistons in both syringes, a pipe connecting the two syringes, a deformable diaphragm closing the chamber defined by one syringe to the rear of the opening of the last mentioned pipe inside the latter and to the front of the pipe connecting said syringe with the corresponding needle and means for detecting, amplifying and measuring the movements of said diaphragm under the resultant action on the latter of the opposed pressures in the two syringes.

3. An apparatus for injecting a liquid under controlled pressure conditions into a cavity in a patient's body comprising at least one syringe, a hypodermic needle associated with said syringe, means for connecting said syringe with the hypodermic needle, a deformable diaphragm closing said syringe ahead of its opening into last mentioned means, means for producing on the downstream side of the diaphragm a reference pressure inside the syringe, a metal core mechanically controlled by the central portion of the diaphragm and slidingly carried in the downstream end of the syringe, a coil surrounding the downstream end of the syringe, an electric circuit including said coil, and a source of supply of alternating current, the frequency of which is controlled by the impedance of said coil and thereby through the position of the core with reference to the coil and means indicating the modifications in the current thus produced by the longitudinal sliding of the core inside the coil under the action of the movement of the diaphragm submitted to the difference in pressure between the two ends of the syringe.

4. An apparatus for injecting a liquid under controlled pressure conditions into a recess in a patient's body, comprising at least one syringe, a hypodermic needle associated with said syringe, means for connecting said syringe with the hypodermic needle, a deformable diaphragm closing said syringe ahead of the opening into the last mentioned means, means for producing on the downstream side of the diaphragm a reference pressure inside the syringe, a metal core mechanically controlled by the central portion of the diaphragm and slidingly carried in the downstream end of the syringe, a coil surrounding the downstream end of the syringe, an electric circuit including said coil, a vacuum tube including at least one cathode, one grid and one anode, operating as an oscillator and the grid circuit of which is coupled with the coil circuit, the variations in the impedance of which control the value of the anode current of said tube, and an indicating instrument measuring the average value of the anode current from said tube and consequently of the pressure of injection through the needle.

5. An apparatus for injecting a liquid under controlled pressure conditions into a recess in a patient's body, comprising at least one syringe, a hypodermic needle associated with said syringe, means for connecting said syringe with the hypodermic needle, a deformable diaphragm closing said syringe ahead of its opening into the last mentioned means, means for producing on the downstream side of the diaphragm a reference pressure inside the syringe, a metal core mechanically controlled by the central portion of the diaphragm and slidingly carried in the downstream end of the syringe, a coil surrounding the downstream end of the syringe, an electric circuit including said coil, a vacuum tube including at least one cathode, one grid and one anode, operating as an oscillator and the grid circuit of which is coupled with the coil circuit the variations in the impedance of which control the value of the anode current of said tube, an indicating instrument measuring the average value of the anode current from said tube and consequently of the pressure of injection through the needle, a cathode ray tube including two vertical plates and two horizontal plates, a time base associated with at least one horizontal plate to provide the latter with a screen-sweeping voltage and means for submitting one of the vertical plates to a voltage following the instantaneous modifications of the anode current to obtain on the screen of the cathode ray tube a diagram of the variations of the injection pressure with time.

6. An arrangement for injecting liquid into a patient's body under controlled pressure conditions, comprising at least one syringe, a piston slidingly carried inside said syringe, means for imparting to said piston a uniform movement, a hypodermic needle connected with the syringe, a differential pressure-measuring device including a deformable diaphragm, the space to one side of said diaphragm being connected with the syringe, means for producing on the other side of the diaphragm a reference pressure, a metal core mechanically coupled with the central portion of said diaphragm, a tube in which said core is guided slidingly, a coil surrounding said guiding tube, the impedance of which is controlled by the shifting of the core inside the tube, a supply of high frequency current, an electric circuit including said coil and said supply, an indicating instrument giving the average value of the amplitude of the current in the circuit and cathode ray tube indicator showing the instantaneous variations of said amplitude.

7. An arrangement for controlling the operation of a syringe, comprising said syringe, a diaphragm closing the syringe ahead of its forward end, a tubular extension of reduced cross-section at the forward end of the syringe, a metal core carried slidingly inside said extension and the movements of which are controlled by those of the diaphragm, a piston slidingly engaging the rear portion of the syringe to the rear of said diaphragm, a lateral port in the syringe slightly to the rear of the diaphragm, an electric motor, means whereby said motor imparts a movement of uniform speed to the piston inside the rear portion of the syringe, means for submitting the front portion of the syringe between the diaphragm and the core to a reference pressure, a hypodermic needle, means for connecting the same to the lateral port of the syringe, electrically operated means controlled by the movements of the core as produced by the movements of the diaphragm submitted on one side to the pressure in the front portion of the syringe and on the other side to the input pressure in the hypodermic needle, and pressure-indicating means controlled by said electrically operated means.

References Cited in the file of this patent

UNITED STATES PATENTS

| | | |
|---|---|---|
| 2,396,351 | Thompson | Mar. 12, 1946 |
| 2,498,672 | Glass | Feb. 28, 1950 |
| 2,574,263 | Hinds | Nov. 6, 1951 |
| 2,646,042 | Hu | July 21, 1953 |